(12) United States Patent  (10) Patent No.: US 8,125,586 B2
Byoun et al.  (45) Date of Patent: Feb. 28, 2012

| (54) | BACK LIGHT ASSEMBLY AND DISPLAY DEVICE HAVING THE SAME |
|---|---|
| (75) | Inventors: Dae Hyoun Byoun, Seoul (KR); Seung Bum Kim, Seoul (KR); Jun Seok An, Suwon-si (KR) |
| (73) | Assignee: SAMSUNG Electronics Co., Ltd., Suwon-si (KR) |
| ( * ) | Notice: Subject to any disclaimer, the term of this patent is extended or adjusted under 35 U.S.C. 154(b) by 288 days. |
| (21) | Appl. No.: 12/465,749 |
| (22) | Filed: May 14, 2009 |
| (65) | Prior Publication Data<br>US 2009/0290090 A1  Nov. 26, 2009 |
| (30) | Foreign Application Priority Data<br>May 20, 2008  (KR) .................. 10-2008-0046430 |
| (51) | Int. Cl.<br>*G02F 1/13357*  (2006.01) |
| (52) | U.S. Cl. .......................................... 349/58; 349/70 |
| (58) | Field of Classification Search .................. None<br>See application file for complete search history. |
| (56) | References Cited |

U.S. PATENT DOCUMENTS

| 5,546,203 A * | 8/1996 | Takao ............................ 349/62 |
| 6,069,646 A * | 5/2000 | Okabe et al. ................... 347/257 |
| 7,481,567 B2 * | 1/2009 | Cho et al. ....................... 362/632 |
| 2002/0167626 A1 * | 11/2002 | Matsuda et al. ................ 349/65 |
| 2004/0157140 A1 * | 8/2004 | Kamata et al. .................... 430/7 |
| 2005/0057946 A1 * | 3/2005 | Kim ................................. 362/561 |
| 2005/0088586 A1 * | 4/2005 | Mori et al. ........................ 349/62 |
| 2006/0239035 A1 * | 10/2006 | Won et al. ....................... 362/632 |
| 2006/0245208 A1 * | 11/2006 | Sakamoto et al. ............. 362/612 |
| 2008/0143918 A1 * | 6/2008 | Kim ................................... 349/58 |
| 2009/0066877 A1 * | 3/2009 | Abe et al. ......................... 349/62 |
| 2009/0290088 A1 * | 11/2009 | Kwak .............................. 349/58 |

FOREIGN PATENT DOCUMENTS

JP  05-323315  12/1993
JP  11-297116 A  * 10/1999

OTHER PUBLICATIONS

Computer translation of detailed description of JP 5-323315A (published Dec. 1993).*

* cited by examiner

*Primary Examiner* — Mike Stahl
(74) *Attorney, Agent, or Firm* — Stanzione & Kim, LLP

(57) ABSTRACT

A backlight assembly and a display device having the same, the backlight assembly including a light guide panel that guides light, a light source to generate light, being mounted to at least one end of the light guide panel, and a bottom chassis made of a reflective resin capable of reflecting light and mounted to cover a rear side of the light guide panel.

23 Claims, 5 Drawing Sheets

BACK LIGHT ASSEMBLY AND DISPLAY DEVICE HAVING THE SAME

CROSS-REFERENCE TO RELATED APPLICATIONS

This application claims the benefit of Korean Patent Application No. 2008-0046430, filed on May 20, 2008, in the Korean Intellectual Property Office, the disclosure of which is incorporated herein in its entirety by reference.

BACKGROUND OF THE INVENTION

1. Field of the Invention

The present general inventive concept relates to a display device, and more particularly to a display device equipped with a backlight assembly that emits light to an LCD panel.

2. Description of the Related Art

A backlight assembly is an apparatus generally adopted in a display device having an LCD panel to emit light to the LCD panel.

Conventionally, general display devices comprise the LCD panel, the backlight assembly to emit light to the LCD panel, an optical sheet mounted between the LCD panel and the backlight assembly, an intermediate bezel to fix the optical sheet to the backlight assembly, and a top chassis to fix the LCD panel to the backlight assembly.

More specifically, the conventional backlight assembly comprises a light guide plate guiding the light, a light source generating light, being mounted to both ends of the light guide plate, a bottom chassis covering a rear side of the light guide plate, and a light source holder mounted to both ends of the respective lamps for stable mounting of the light sources to the bottom chassis. Here, the light sources include a cold cathode tube formed with a fluorescent layer on an inside thereof, and a cold cathode fluorescence lamp (CCFL) in which electrodes are mounted at both inner sides of the cold cathode tube.

In the above-structured backlight assembly for the display device, a reflection plate is necessarily disposed behind the light guide plate such that the light emitted from the light can be reflected toward the LCD panel. However, it is also possible that the bottom chassis that covers the rear side of the light guide plate is made of a reflective resin to function as the reflection plate.

However, in the above-described conventional backlight assembly applied in the display device, since the bottom chassis is formed of a reflective resin having low thermal conductivity and the light guide plate is disposed so near to the LCD panel, heat generated from the light sources is transmitted to the LCD panel, failing to be favorably exhausted to the outside, thereby increasing the temperature of the LCD panel excessively.

SUMMARY OF THE INVENTION

The present general inventive concept provides a display device capable of efficiently exhausting heat generated from light sources to the outside of a bottom chassis.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a backlight assembly including a light guide panel that guides light, a light source generating light, being mounted to at least one end of the light guide panel, a bottom chassis made of a reflective resin capable of reflecting light and mounted to cover a rear side of the light guide panel, and a heat emission member mounted to the bottom chassis to exhaust heat generated from the light source to the outside of the bottom chassis.

The heat emission member may be mounted at positions corresponding to both ends of the light source.

The light source is mounted to both sides of the light guide panel, being extended in a longitudinal direction, and the heat emission member is mounted corresponding to an upper end of the light source.

Light source may include a cold cathode tube lamp, and a pair of electrodes mounted at both inner sides of the cold cathode tube lamp.

In addition, a lamp holder may be mounted to both ends of the cold cathode tube to fix the lamp, a penetration hole is formed on the bottom chassis at each position corresponding to the lamp holder, and the heat emission member may be mounted to the lamp holder through the penetration hole.

The heat emission member may be mounted at positions corresponding to the electrodes.

The light guide plate may be integrally formed with the bottom chassis through double injection molding.

The material for the bottom chassis may be a compound of polycarbonate and 10~20% of glass fiber.

The foregoing and/or other aspects and utilities of the present general inventive concept may also be achieved by providing a display device including an LCD panel, and a backlight assembly that emits light to the LCD panel, wherein the backlight assembly comprises a light guide panel that guides light to the LCD panel, a light source generating light, being mounted to at least one end of the light guide panel, a bottom chassis made of a reflective resin capable of reflecting light and mounted to cover a rear side of the light guide panel, and a heat emission member penetratingly mounted to the bottom chassis to exhaust heat generated from the light source to the outside of the bottom chassis.

Here, the light source may include a cold cathode tube lamp, and a pair of electrodes mounted at both inner sides of the cold cathode tube. Additionally, the cold cathode tube lamp may be formed longer than a width of the LCD panel, such that both ends of the cold cathode tube lamp protrude to both sides of the LCD panel and the electrodes are mounted inside the protruding both ends.

As described above, in the backlight assembly and the display device having the same according to the embodiments of the present invention, since the heat emission member is provided to the bottom chassis formed of a reflective resin, heat generated from the lamps can be effectively exhausted to the outside through the heat emission member. As a result, a proper temperature of the LCD panel can be maintained.

The foregoing and/or other aspects and utilities of the present general inventive concept may also be achieved by providing a backlight assembly, including a bottom chassis to support a light guide plate therein and including at least one pair of penetration holes disposed at opposite ends thereof to support opposite ends of a respective lamp, and a heat emission member including one end to extend through a respective one of the penetration holes to be in contact with a respective end of the lamp and to extend at another end through the bottom chassis to transmit heat generated by the contacted lamp outside of the bottom chassis and away from the light guide plate.

The heat emission member is formed of a material having a higher thermal conductivity than the bottom chassis.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
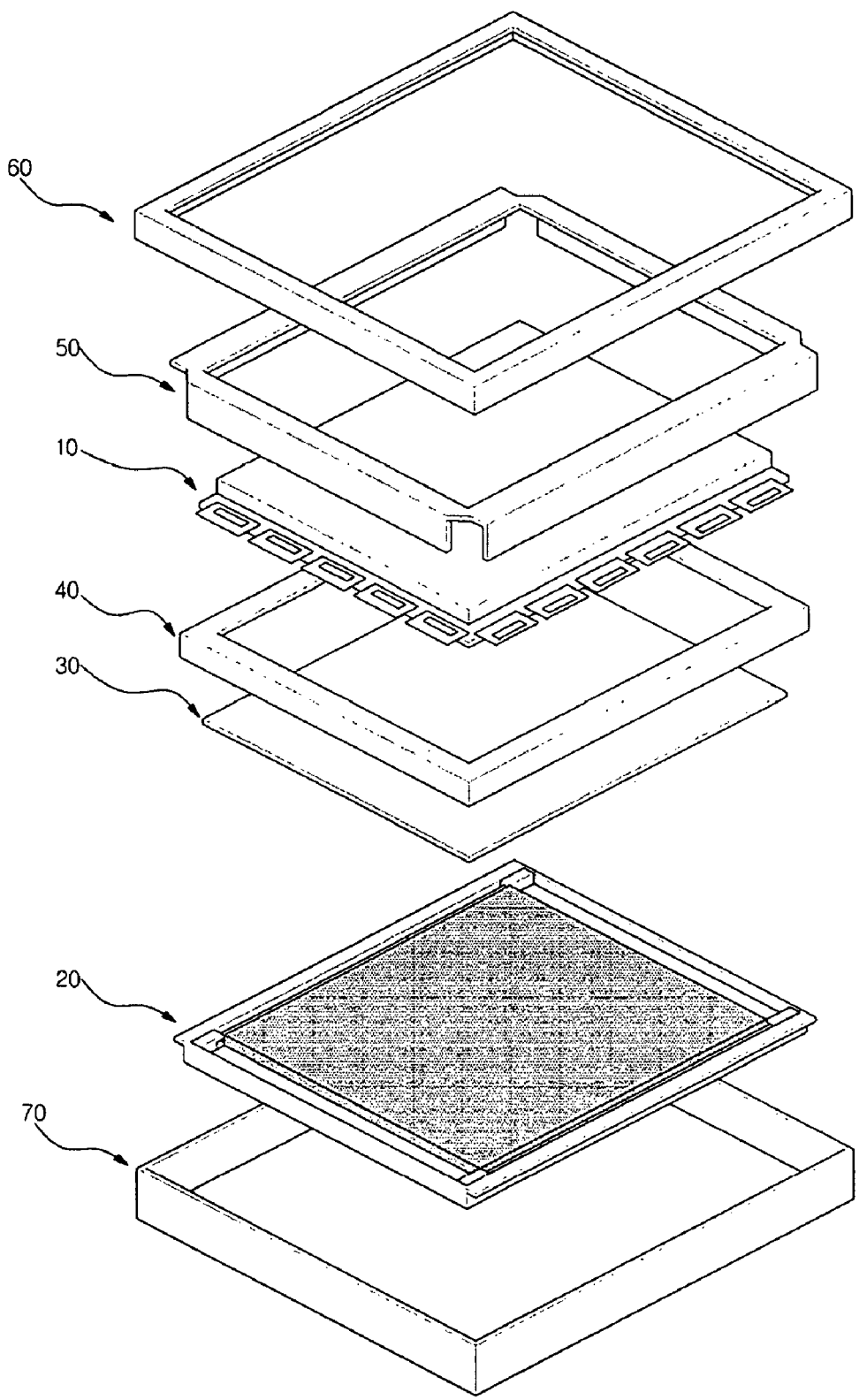
FIG. 1 is an exploded perspective view of a display device according to an embodiment of the present general inventive concept.

Reference will now be made in detail to an exemplary embodiment of the present general inventive concept, examples of which are illustrated in the accompanying drawings, wherein like reference numerals refer to like elements throughout. The embodiments are described below in order to explain the present general inventive concept by referring to the figures.

Hereinafter, a display device according to an embodiment of the present general inventive concept will be described with reference to the accompanying drawings.

As shown in FIG. 1, the display device comprises an LCD panel 10 that displays an image, a backlight assembly 20 that emits light to the LCD panel 10, an optical sheet 30 mounted between the LCD panel 10 and the backlight assembly 20, an intermediate bezel 40 that fixes the optical sheet 30 to the backlight assembly 20, and a top chassis 50 that fixes the LCD panel to the backlight assembly 20.

In addition, a front cover 60 can be disposed at a front side of the top chassis 50, and a rear cover 70 can be disposed at a rear side of the backlight assembly 20 and connected with the front cover 60. Thus, the exterior appearance of the backlight assembly 20 can be constituted by the front cover 60 and the rear cover 70.

Figure 2:
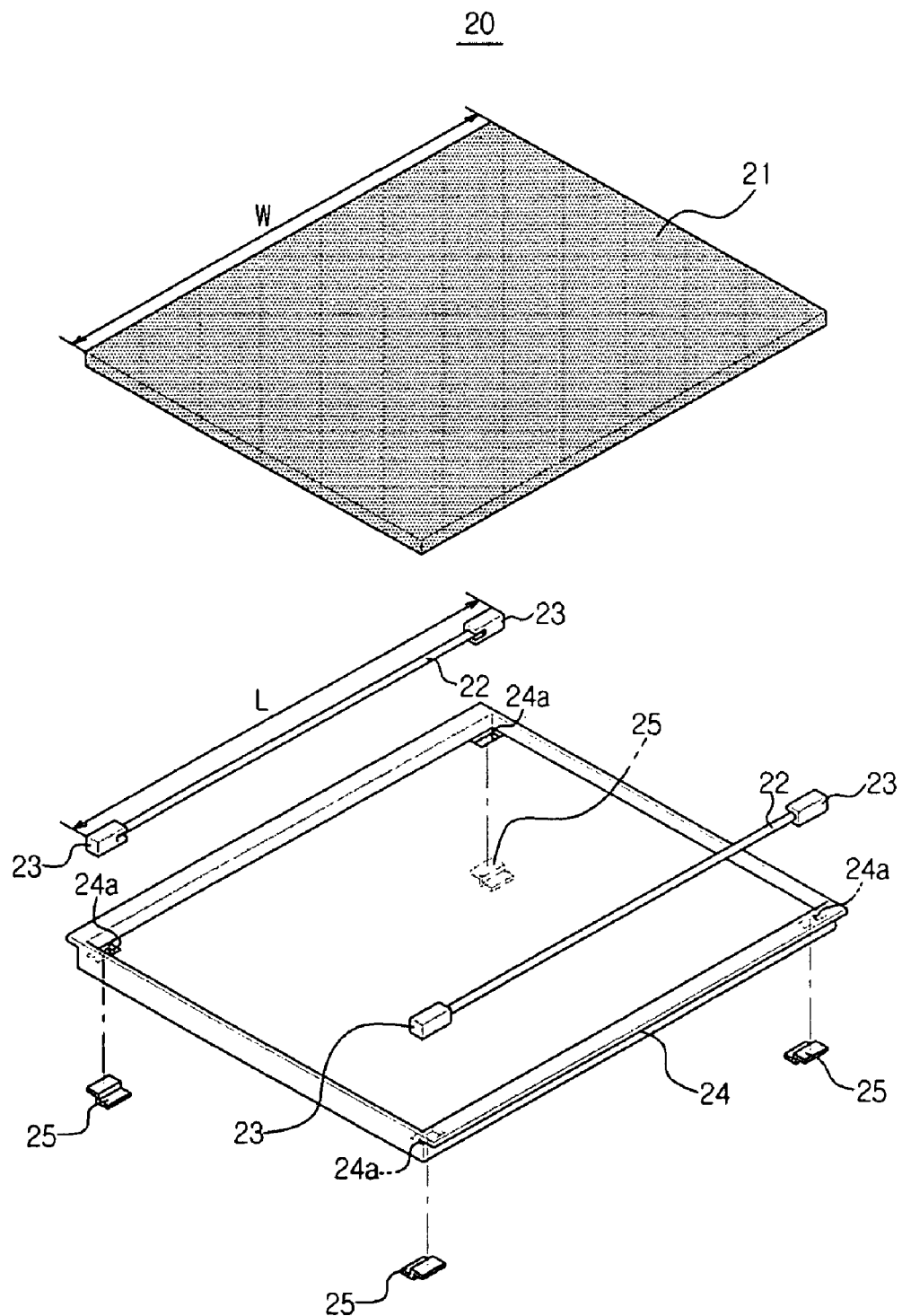
FIG. 2 is an exploded perspective view of a backlight assembly according to an embodiment of the present general inventive concept.

As shown in FIG. 2, the backlight assembly 20 may further include a light guide plate 21 that guides light to the LCD panel 10, a light source 22 mounted to at least one of both ends of the light guide plate 21 to generate light, a bottom chassis 24 mounting the light guide plate 21 and the light source 22 therein and covering a rear side of the light guide plate 21, and a light source holder 23 mounted to both ends of the light source 22 to securely fix the light source 22 to the bottom chassis 24. In this embodiment, a pair of the light sources 22 are mounted to both ends of the light guide plate 21 and the light source holder 23 is mounted to both ends of the respective light sources 22.

Figure 3:
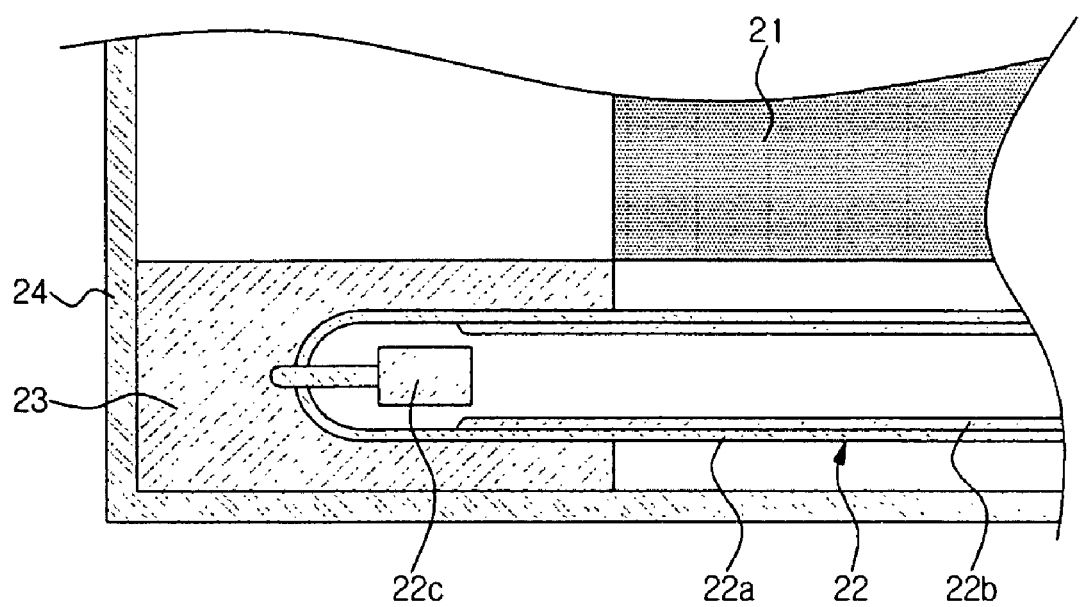
FIG. 3 is a sectional view of a lamp of the backlight assembly.

As shown in FIG. 3, each of the light sources 22 comprises a cold cathode tube lamp 22a including a fluorescent layer 22b on an inside thereof, and a cold cathode fluorescence lamp (CCFL) including a pair of electrodes 22c mounted at both inner sides of the cold cathode tube 22a.

Referring back to FIG. 2, the light guide plate 21, which is provided to guide the light generated from the light source 22 toward the LCD panel 10, is made of a transparent resin. According to this embodiment, the light guide panel 21 is separately manufactured and fixed in the bottom chassis 24.

The optical sheet 30 improves optical property of the light emitted by the backlight assembly 20. Although only one optical sheet 30 is employed in this embodiment, it is also possible to employ various types of plural optical sheets 30 as necessary.

The bottom chassis 24 is made of a reflective resin such as polycarbonate (PC) so as to reflect the light emitted from the light source 22 toward the LCD panel 10. If a compound of the PC and 10~20% of glass fiber is used for the material of the bottom chassis 24, while reflectivity of the bottom chassis 24 is maintained over a predetermined degree, strength of the bottom chassis 24 can be increased whereas a thermal expansion rate can be reduced. Therefore, deformation of the bottom chassis 24 caused by an external force or heat generated from the light source 22 can be considerably reduced.

Furthermore, in the backlight assembly 20 applied to a display device according to the embodiment of the present general inventive concept, a heat emission member 25 is mounted to the bottom chassis 24 such that heat generated by the light source 22 can be exhausted to the outside of the bottom chassis 24 favorably. The heat emission member 25 is made of a material having a high thermal conductivity, such as metal, and is mounted to penetrate the bottom chassis 24 so that the heat generated from the light source 22 mounted in the bottom chassis 24 can be exhausted out of the bottom chassis 24.

Since the light source 22 is comprised of the cold cathode fluorescence lamp (CCFL), the heat is usually generated at the electrodes 22c mounted at both inner sides of the cold cathode tube lamp 22a. Therefore, the heat emission member 25 is mounted at positions corresponding to the both ends of the light sources 22 where the electrodes 22c are mounted, for efficient exhaustion of the heat generated from the electrodes 22c. Here, a penetration hole 24a to mount the heat emission member 25 is formed in the bottom chassis 24 at each position corresponding to the electrodes 22c.

Figure 4:
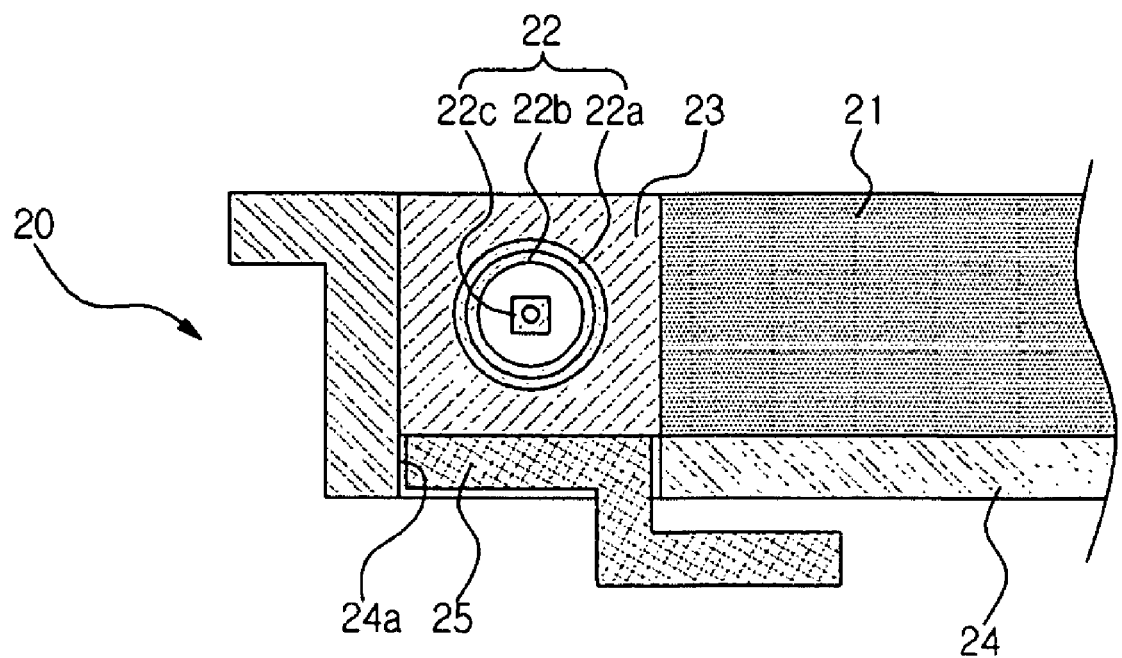
FIG. 4 is a sectional view showing a mounted structure of a heat emission member in the backlight assembly.

In this embodiment, since the lamp holders 23 are mounted to both ends of the light source 22 wherein the electrodes 22c are mounted, that is, both ends of the cold cathode tube lamp 22a, each heat emission member 25 can be either in contact with or mounted to the respective lamp holder 23 through the respective penetration hole 24a, as shown in FIG. 4. Accordingly, the heat emission member 25, being either in contact with or mounted to the respective lamp holder 23, transmits the heat generated from the electrodes 22c through the lamp holder 23 and exhausts the heat to the outside of the bottom chassis 24.

Figure 5:
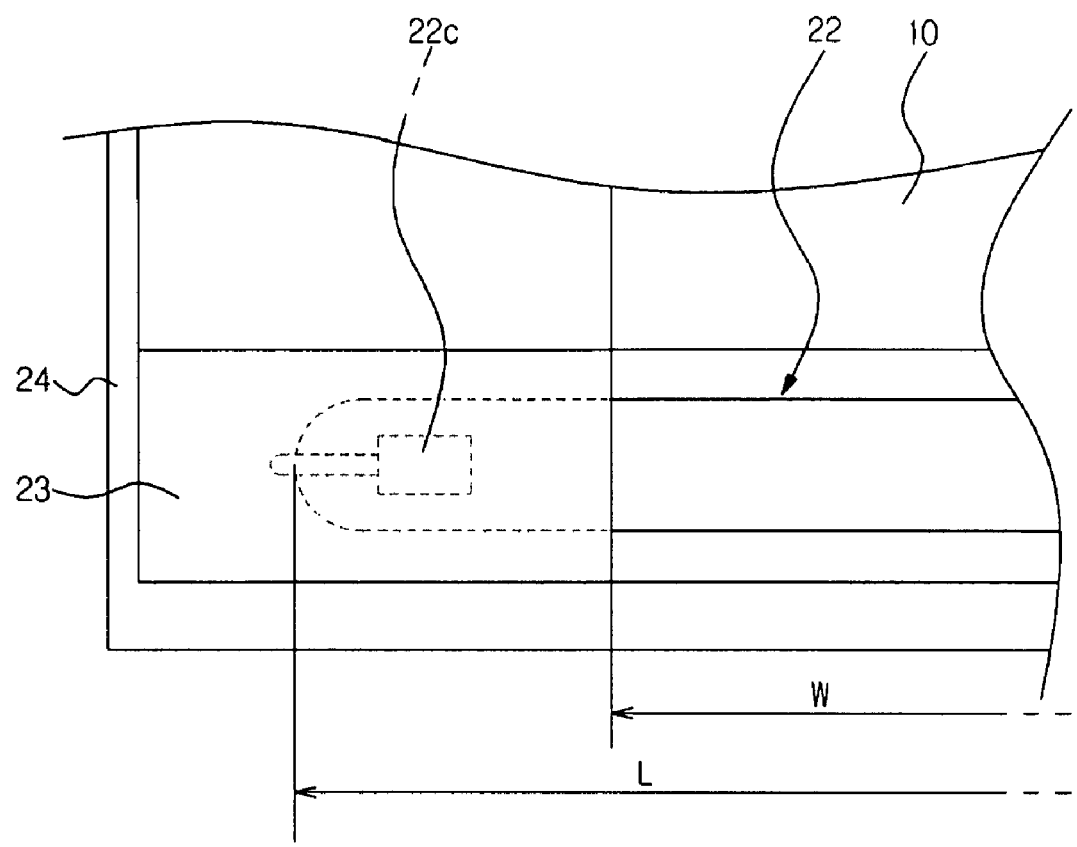
FIG. 5 is a plan view showing mounting positions of electrodes of the lamp in the backlight assembly.

In addition, in the display device according to the present embodiment, a length L of the cold cathode tube lamp 22a is relatively greater than a width W of the LCD panel 10 as shown in FIG. 2. Therefore, the both ends of the cold cathode tube lamp 22a can protrude beyond both sides of the LCD panel 10 as shown in FIG. 5. The electrodes 22c are mounted within the both ends of the cold cathode tube lamp 22a that protrude beyond both sides of the LCD panel 10. When the electrodes 22c are thus disposed in the protruding ends of the cold cathode tube lamp 22a, direct transmission of the heat from the heat 22c to the LCD panel 10 can be prevented. As a consequence, temperature of the LCD panel 10 can be maintained under a predetermined degree.

In this embodiment, the heat emission members 25 are mounted at positions corresponding to the both ends of the light source 22. However, in a case where the light sources 22 are arranged in a longitudinal direction along both ends of the light guide panel 21, heat is focused to an upper end of the light source 22 more than to a lower end of the light source 22 because gas being heated is apt to move upward due to its decreasing density. Therefore, the heat emission member 25 may be mounted corresponding to only the upper end of the light source 22, where a relatively greater heat is focused, rather than both ends of the light source 22.

Also, although the bottom chassis 24 and the light guide panel 21 are separately manufactured and then the light guide panel 21 is fixed to the bottom chassis 24 in this embodiment, the inventive concept is not limited to this method. That is, the light guide panel 21 and the bottom chassis 24 may be integrally formed through double injection molding. More specifically, after any one of the light guide panel 21 and the bottom chassis 24 is formed by injection molding first, the other one can be injection molded later from the previous one so that the light guide panel 21 and the bottom chassis 24 are formed as a solid body.

Although the light source 22 including the cold cathode tube lamp 22a in this embodiment, the inventive concept is not limited to this embodiment, and the light source 22 may include a light emitting diode (LED).

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A backlight assembly comprising:
   a light guide panel that guides light;
   a light source to generate light, the light source being mounted to at least one end of the light guide panel;
   a bottom chassis formed of a reflective resin that reflects the light from the light source to the light guide panel and mounted to cover a rear side of the light guide panel;
   a penetration hole formed on the bottom chassis; and
   a heat emission member mounted to the light source through the penetration hole of the bottom chassis to exhaust heat generated from the light source to the outside of the bottom chassis.

2. The backlight assembly according to claim 1, wherein the heat emission member is mounted at positions corresponding to both ends of the light source.

3. The backlight assembly according to claim 1, wherein the light source is mounted to both sides of the light guide panel, extending in a longitudinal direction, and the heat emission member is mounted corresponding to an upper end of the light source.

4. The backlight assembly according to claim 1, wherein the light source comprises a cold cathode tube lamp and a pair of electrodes mounted at both inner sides of the cold cathode tube lamp.

5. The backlight assembly according to claim 4, wherein:
   a lamp holder is mounted at both ends of the cold cathode tube lamp to fix the cold cathode tube lamp,
   a penetration hole is formed on the bottom chassis at each position corresponding to the lamp holder, and
   the heat emission member includes one end mounted to the lamp holder through the penetration hole, and another end extending to outside of the bottom chassis through the penetration hole.

6. The backlight assembly according to claim 4, wherein the heat emission member is mounted at positions corresponding to the electrodes.

7. The backlight assembly according to claim 1, wherein the light guide plate is integrally formed with the bottom chassis through double injection molding.

8. The backlight assembly according to claim 1, wherein the material for the bottom chassis is a compound of polycarbonate and 10~20% of glass fiber.

9. A display device comprising:
   an LCD panel; and
   a backlight assembly that emits light to the LCD panel,
   wherein the backlight assembly comprises a light guide panel that guides light to the LCD panel, a light source to generate the light, being mounted to at least one end of the light guide panel, a bottom chassis made of a reflective resin that reflects the light from the light source to the light guide panel and mounted to cover a rear side of the light guide panel, and a heat emission member mounted to the light source through a penetration hole formed on the bottom chassis to exhaust heat generated from the light source to the outside of the bottom chassis.

10. The display device according to claim 9, wherein the light source is mounted to both sides of the light guide panel and extends in a longitudinal direction, and the heat emission member is mounted corresponding to an upper end of a cold cathode tube lamp.

11. The display device according to claim 9, wherein the light source comprises:
    a cold cathode tube lamp; and
    a pair of electrodes mounted at both inner sides of the cold cathode tube lamp.

12. The display device according to claim 9, wherein the heat emission member is mounted at positions corresponding to both ends of a cold cathode tube lamp.

13. The display device according to claim 9, wherein a lamp holder is mounted to both ends of a cold cathode tube lamp to fix the cold cathode tube lamp, a penetration hole is formed on the bottom chassis at each position corresponding to the lamp holder, and the heat emission member includes one end mounted to the lamp holder through the penetration hole, and another end extending to outside of the bottom chassis through the penetration hole.

14. The display device according to claim 11, wherein the heat emission member is mounted at positions corresponding to the electrodes.

15. The display device according to claim 13, wherein the cold cathode tube lamp is formed to be longer than a width of the LCD panel, such that both ends of the cold cathode tube lamp protrude to both sides of the LCD panel and electrodes are mounted inside the protruding both ends.

16. The display device according to claim 9, wherein the light guide panel is integrally formed with the bottom chassis through double injection molding.

17. The display device according to claim 9, wherein the material for the bottom chassis is a compound of polycarbonate and 10~20% of glass fiber.

18. A backlight assembly, comprising:
    a bottom chassis to support a light guide panel therein and including at least one pair of penetration holes disposed at opposite ends thereof to support opposite ends of a respective lamp, the bottom chassis being formed of a reflective resin that reflects light from the lamp and
    a heat emission member including one end to extend through a respective one of the penetration holes to be in contact with a respective end of the lamp and to extend at another end through the respective one of the penetration holes of the bottom chassis to transmit heat generated by the contacted lamp outside of the bottom chassis and away from the light guide panel.

19. The backlight assembly according to claim 18, wherein the ends of each lamp include a lamp holder having an electrode disposed therein, and the one end of the heat emission member contacts the lamp holder.

20. The backlight assembly according to claim 18, wherein the ends of each lamp include a lamp holder having an electrode disposed therein, and the one end of the heat emission member is mounted to the lamp holder.

21. The backlight assembly according to claim 18, wherein the heat emission member is formed of a material having a higher thermal conductivity than the bottom chassis.

22. The backlight assembly of claim 1, wherein the heat emission member mounted to the light source extends to outside of the bottom chassis through the penetration hole in a non-contact state with the bottom chassis.

23. The display device of claim 9, wherein the heat emission member mounted to the light source extends to outside of the bottom chassis through the penetration hole in a non-contact state with the bottom chassis.

* * * * *